FIG. 3

United States Patent Office 3,406,010
Patented Oct. 15, 1968

3,406,010
RECOVERY OF PURE CRYSTALS OF AlCl$_3$·6H$_2$O AND PRODUCTION OF ALUMINUM OXIDE PRODUCT THEREFROM
Francis L. Holderreed and Robert E. Sullivan, Anaconda, Mont., assignors to The Anaconda Company
Filed Sept. 8, 1965, Ser. No. 485,858
10 Claims. (Cl. 23—143)

ABSTRACT OF THE DISCLOSURE

Pure aluminum chloride hexahydrate is recovered from aqueous solutions thereof containing other metal chlorides as impurities therein by continuously evaporating the solution to precipitate crystals AlCl$_3$·6H$_2$O of the desired high purity which are then recovered, continuously adding fresh feed solution to replenish the aluminum content of the mother liquor in the evaporation, and continuously withdrawing a bleed portion of the mother liquor to prevent the build-up of impurities in the mother liquor above a predetermined maximum value. The bleed portion withdrawn from the mother liquor in the first evaporator is subjected to a second evaporation and crystallization operation essentially similar to the first evaporation and crystallization operation, the amount of bleed liquor withdrawn from the second mother liquor in the second evaporation being such that the crystals of AlCl$_3$·6H$_2$O precipitated from the second mother liquor are contaminated with an amount of other metal chlorides no greater than the amount of said other metal chlorides present in the fresh feed solution being added to the first mother liquor. These impure crystals of AlCl$_3$·6H$_2$O are recovered and recycled to said fresh feed solution being added to the first mother liquor.

---

The conventional electrolytic process for the production of metallic aluminum from alumina requires that the alumina employed as the feed material for the electrolytic cells or pot lines of the process be substantially free of iron, chromium, and other harmful contaminants. Pot line grade alumina can be produced from high grade bauxite ores by any of several well known procedures. However, difficulties are encountered in producing high grade alumina when the ore from which the aluminum is extracted contains significant amounts of silica or iron or other harmful materials. For example, it has heretofore been proposed that clay, which is plentiful and relatively inexpensive and which consists mainly of hydrated aluminum silicates together with a variety of other minerals, be employed as the source of aluminum in the preparation of pot line grade alumina. Aluminum can readily be extracted from clay by leaching the calcined clay with an acid, for example hydrochloric acid, to obtain water-soluble aluminum salts which are then treated to convert the aluminum content thereof to alumina. However, the acid leach process dissolves other metals besides aluminum that are present in the clay, and as a consequence the acid leach liquor thus obtained is contaminated with corresponding amounts of undesirable metallic salts, such, for example, as iron, chromium, calcium, magnesium, titanium, potassium, and other metal chlorides, from which the desired aluminum salt must be separated in relatively pure form if an acceptable pot line grade alumina is to be prepared therefrom. Although considerable effort has been devoted to the development of commercially feasible procedures for the separation and recovery of relatively pure aluminum salts from the relatively impure acid leach liquor, most of the procedures heretofore proposed have proved to be inadequate, uneconomic or impractical for one reason or another.

The aluminum-containing acid leach liquor obtained by the digestion of clay with a mineral acid may contain as much as 10 grams per liter (g./l.), or even more, of Fe$_2$O$_3$ present in the leach liquor in the form of a water-soluble iron salt (usually ferric chloride) which quantity of iron is far in excess of that which can be tolerated if pot line grade alumina substantially free of Fe$_2$O$_3$ is to be produced from the aluminum content of the liquor. A substantial portion of the undesired iron salts can be removed from the aluminum-containing acidic leach liquor by extraction of the iron with a selective water-insoluble organic reagent or sequestrant that is specific for the iron salt present in the liquor. However, although most, but by no means all, of the iron content of the leach liquor can be removed by this extraction operation, the aluminum-containing leach liquor also contains minor but harmful quantities of other metal salts, for example, chromium chloride, that are not removed from the liquor by the aforementioned extraction operation. Accordingly, it is necessary to further treat the aluminum-containing solution in some manner in order to recover therefrom a relatively pure aluminum salt product that is substantially free of other metal salts and, therefore, that advantageously can be directly converted to pot line grade alumina.

One well known procedure for recovering a relatively pure crystalline salt product from a solution containing a mixture of metal salts is by fractional crystallization of the desired salt constituent of the solution. In this known procedure the salt-containing solution is concentrated by evaporation of the water content of the solution to precipitate therefrom crystals of the desired salt (usually the predominant salt present in the solution), the crystalline precipitate thus obtained containing a relatively smaller proportion of the other unwanted or contaminant salts present in the system than the relative proportion of these salts present in the intial salt-containing solution. The relatively pure salt crystals thus obtained are redissolved and recrystallized one or more additional times to further purify the salt product, the mother liquor from which the increasingly pure salt crystals are precipitated being in each case discarded because it contains excessive quantities of the unwanted metal salts. However, although this conventional fractional crystallization procedure will produce a relatively pure aluminum salt product from an aluminum-containing acid leach liquor, it is not economic for large scale commercial production of pot line grade alumina because of the need for repeated recrystalliaztions of the aluminum salt product which in each case necessitates the evaporation or, in effect, the re-evaporation of a large quantity of water and because of the loss of valuable aluminum salts remaining in the mother liquor that is discarded following each recrystallization step.

We have now discovered and developed a new process for separating and recovering relatively pure crystalline aluminum salts from aqueous solutions containing aluminum and minor but significant amounts of other metal salts, our new process being akin to but a significant improvement over the aforementioned conventional fractional crystallization procedure from the standpoint of both procedural efficiency and economy of operation. In our new process for separating and recovering high purity aluminum salts, and in particular high purity aluminum chloride, from an aqueous solution containing aluminum and other metal salts, the solution (for example, an acid leach liquor containing aluminum and other metal chlorides) is concentrated by evaporating water therefrom to obtain a first mother liquor from which relatively pure crystals of aluminum chloride hexahydrate precipitate, these relatively pure crystals being separated from the mother liquor and recovered for subsequent treatment.

Additional aluminum chloride-containing aqueous feed solution is substantially continuously added to the first mother liquor to replenish the aluminum chloride hexahydrate precipitated therefrom, while water is continuously evaporated from the first mother liquor to maintain the concentration of aluminum chloride in said liquor at or slightly above that concentration at which the first mother liquor is saturated with aluminum chloride, and a portion of the first mother liquor is substantially continuously withdrawn from the main body of said first mother liquor so that the concentration of metal chlorides other than aluminum chloride in said main body of the first mother liquor is maintained below that concentration at which a significant amount of said other metal chlorides crystallize and precipitate with, or otherwise contaminate, the aluminum chloride hexahydrate crystals precipitated from the main body of the first mother liquor.

The portion of the first mother liquor substantially continuously withdrawn from the main body of this liquor contains a somewhat greater relative proportion of the unwanted or contaminant metal chlorides than does the initial aluminum chloride-containing feed solution, and this portion is further treated by evaporating an additional quantity of water therefrom to obtain a second mother liquor from which are precipitated crystals of aluminum chloride hexahydrate contaminated with minor but significant quantities of these other unwanted metal chlorides. The impure crystals of aluminum chloride hexahydrate thus precipitated are separated from the second mother liquor and then are mixed with the aluminum chloride-containing aqueous feed solution being added to the first mother liquor. The portion of the first mother liquor being substantially continuously withdrawn from the main body of this liquor is substantially continuously added to the second mother liquor, and water is continuously evaporated from the second mother liquor to maintain the concentration of aluminum chloride in said liquor at or slightly above that concentration at which the second mother liquor is saturated with aluminum chloride. A sufficient quantity of the second mother liquor is substantially continuously withdrawn from the main body of said second mother liquor so that the concentration of metal chlorides other than aluminum chloride in the second mother liquor is maintained below that concentration at which the aluminum chloride hexahydrate precipitated therefrom will contain a relative amount of other unwanted metal chlorides in excess of the relative amount of these metal chlorides present in the initial aluminum chloride-containing feed solution.

The portion of the second mother liquor withdrawn from the main body of said mother liquor may be discarded, or treated for the recovery of the chlorine content thereof, or, if desired, subjected to a third evaporation and crystallization step similar to the second evaporation and crystallization step of the process. In the latter case, the amount of the third mother liquor withdrawn from the main body of this mother liquor is sufficient to maintain the concentration of metal chlorides other than aluminum chloride in said third mother liquor below that concentration at which the relative proportion of these other metal chlorides present in the crystal salt product of the third evaporation-crystallization step will exceed the relative proportion of these metal chlorides present in the first mother liquor being withdrawn from the first evaporation-crystallization step and being added to the second mother liquor in the second evaporation-crystallization step. As before, the portion of the third mother liquor withdrawn from the main body of this mother liquor in the third evaporation-crystallization step may be discarded, or treated for recovery of the hydrogen chloride or chlorine content thereof, or, in rare cases, subjected to yet another evaporation and crystallization step similar to the preceeding steps of the process.

It is important to note that, in our new process for separating and recovering a relatively pure aluminum chloride hexahydrate product from impure aqueous solutions of this salt, the desired relatively pure aluminum salt product is precipitated and recovered in the course of the first evaporation and crystallization step of the process rather than in the course of the last crystallization step as is the case with conventional fractional crystallization procedures. The relatively pure aluminum salt product thus recovered is then advantageously treated (for example, by calcination) to convert it to aluminum oxide of sufficient high purity for use in the electrolytic production of aluminum. The relatively impure aluminum salt products precipitated and recovered in the course of each of the succeeding evaporation and crystallization steps of the process are each recycled to that point in the process where the relative proportion of contaminant metal salts present in the precipitate is no greater than the relative proportion of these contaminant salts present in the salt solution at the aforesaid point in the process. The successive evaporation and crystallization steps are employed in our process primarily for the purpose of insuring that a sufficient quantity of the aluminum present in the initial feed solution will ultimately be recovered in the form of a relatively pure aluminum salt product to make the process economically and commercially feasible. The successive evaporation and crystallization steps may be carried out on increasingly impure salt solutions until the quantity of the mother liquor that must be withdrawn from the main body of mother liquor in any one evaporation and crystallization step (if precipitation from the mother liquor of a crystalline product containing more than the desired or acceptable quantity of containment salts is to be avoided) the approaches the quantity of the impure aluminum chloride-containing solution that is being introduced into the mother liquor of this evaporation-crystallization step. Of course, the process may be terminated at an earlier crystallization step if so desired.

In this connection it is of fundamental significance in our process that, although the process may involve a number of successive evaporation and crystallization steps, the water present in the initial aluminum chloride-containing feed solution is evaporated only once, or, stated differently, the total amount of water evaporated in the course of all the evaporation and crystallization steps of our process need not exceed the quantity of water present in the initial feed solution. This important feature of our process is a result of the fact that the relatively pure salt product of the first evaporation and crystallization step is not redissolved in water and then recrystallized, and also to the fact the relatively impure salt products of subsequent evaporation and crystallization steps are redissolved in the impure salt solution being treated. Thus, our process avoids the costly procedural steps and high fuel consumption inherent in conventional fractional crystallization and recrystallization processes wherein the quantity of water that must be evaporated in the course of the several evaporation, recrystallization and redissolution steps of the process greatly exceeds (by several fold) the quantity of water present in the initial feed solution. Moreover, the quantity of aluminum chloride present in the concentrated impure mother liquor withdrawn from the last evaporation and crystallization step of our process and then discarded is appreciably less than the total quantity of aluminum chloride that would be lost with the several mother liquors discarded in the course of comparable conventional fractional recrystallization processes.

A further important advantage of our process resides in the fact that the aluminum salt product obtained in the course of the first evaporation and crystallization step of the process may be of any desired degree of purity ranging from aluminum chloride (or alumina) of CP or reagent grade purity to aluminum chloride (or alumina) only slightly less contaminated with extraneous salts than is the aluminum chloride in the initial feed solution. Accordingly, in an important modification of our process a small quantity or side stream of the initial aluminum chloride-containing feed solution is diverted from the main stream of the feed solution, and this side stream is subjected to a preliminary evaporation and crystallization step in the course of which substantially completely pure aluminum chloride hexahydrate is precipitated and recovered from which precipitate reagent or CP grade alumina may subsequently be obtained. Obviously, a relatively large quantity of side stream mother liquor must be withdrawn or bled from the main body of side stream mother liquor in the preliminary evaporation-crystallization apparatus in order to obtain such a high purity salt product, and this relatively large quantity of bleed liquor is introduced directly into the evaporator-crystallizer apparatus of the first evaporation and crystallization step of the process along with the balance of the main stream of the aluminum chloride-containing feed solution.

Although our new process was specifically developed to separate and recover relatively pure aluminum chloride from aqueous solutions containing aluminum chloride and other metal chlorides, such as ferric chloride, chromic chloride, and the like, it is apparent that the process can be employed to separate and recover a relatively pure crystalline salt from any aqueous solution containing mixtures of salts which can be purified by conventional fractional crystallization techniques. Moreover, if the aqueous solution comprises a mixture of three or more salts having a common anion from which solution one salt (usually, the predominant salt present in the mixture) is to be recovered substantially free of the other metal salts present therein, one of the unwanted metals (usually, but not necessarily, the metal whose presence in the purified salt product is least desirable) is selected as the contaminant whose concentration in the mother liquor controls the quantity of the liquor that must be continuously withdrawn therefrom in the first (and subsequent) evaporation and crystallization step in order to prevent the build up of the concentration of the control contaminant in the mother liquor above the maximum that will permit recovery of a substantially pure crystalline salt product therefrom. For example, if it is desired to recover substantially pure crystals of aluminum chloride hexahydrate from an aqueous solution containing aluminum chloride and minor amounts of ferric chloride and chromic chloride, either the ferric chloride concentration or the chromic chloride concentration in the mother liquor can be used as the controlling factor in determining the quantity of the mother liquor that must be continuously withdrawn therefrom in order to maintain the concentration of the contaminant metal salts in the mother liquor below the maximum that will result in the recovery of the desired pure aluminum chloride hexahydrate product. Because chromium is potentially the more troublesome of the two unwanted metal salts in the hypothetical example just given, we preferabliy would employ chromium as the controlling contaminant in determining the quantity of bleed material to be withdrawn from the mother liquor.

By way of example of the use of the chromium as the controlling contaminant in the production of pot line grade alumina pursuant to our process, a typical acid leach liquor obtained by digesting calcined Georgia clay in hydrochloric acid may contain about 80.0 g./l. of $Al_2O_3$ and about 0.02 g./l. of $Cr_2O_3$ (present in the solution in the form of aluminum chloride and chromic chloride, respectively) together with a wide variety of other metal chlorides. If the quantity of mother liquor withdrawn from the first evaporation-crystallization step of the process is such that the concentration of $Cr_2O_3$ (present in the form of chromic chloride) in the first mother liquor does not exceed about 0.25 g./l., the aluminum chloride salt product precipitated and recovered in the course of this evaporation and crystallization step will contain not more than about 0.002% by weight of $Cr_2O_3$, and all of the other contaminant metals present in the salt product will be below the maximum permissible amount of these metals that may be present if pot line grade alumina is to be produced from the salt product. This feature of our process is illustrated in the following tabulation comparing the analysis of a typical acid leach liquor with that of the pot line grade alumina ultimately produced therefrom based on the control of the chromium content of the mother liquor pursuant to the practice of our invention.

| Constituent* | Analysis | |
|---|---|---|
| | Acid Leach Liquor (grams/liter) | Calcined Product (percent by wt.) |
| $Al_2O_3$ | 80.0 | 99.5+ |
| $Cr_2O_3$ | 0.019 | 0.0023 |
| $Fe_2O_3$ | 0.04 | 0.005 |
| $TiO_2$ | 0.024 | 0.001 |
| CaO | 0.28 | 0.030 |
| MgO | 0.36 | 0.05 |
| $SiO_2$ | 0.031 | 0.014 |
| $Na_2O$ | 0.46 | 0.01 |
| $K_2O$ | 0.21 | 0.01 |
| $P_2O_5$ | 0.017 | 0.015 |
| $V_2O_5$ | 0.041 | 0.008 |
| NiO | 0.006 | 0.0028 |
| MnO | 0.015 | 0.0023 |
| $B_2O_3$ | 0.012 | 0.0016 |
| CuO | 0.009 | 0.0008 |
| ZnO | 0.09 | 0.002 |
| $Ga_2O_3$ | 0.021 | 0.002 |

*These constituents were present in the liquor in the form of their respective chlorides. However, all assays are reported on an equivalent oxide basis.

Our new process will be better understood from the following description thereof in conjunction with the accompanying drawings of which

For the sake of convenience the practice of our new process will be described first in connection with the separation and recovery of relatively pure crystals of aluminum chloride hexahydrate from a solution containing a substantial amount of dissolved aluminum chloride and a minor amount of dissolved ferric chloride, although it will be understood that what is said with respect to the separation of aluminum chloride from this solution applies with equal force to the separation and recovery of any salt susceptible to purification by fractional crystallization from impure solutions of this salt, and in particular it applies to the separation of aluminum chloride hexahydrate from acidic leach liquors containing a relatively large amount of aluminum chloride in addition to minor amounts of a wide variety of other metal chlorides.

Figure 3:
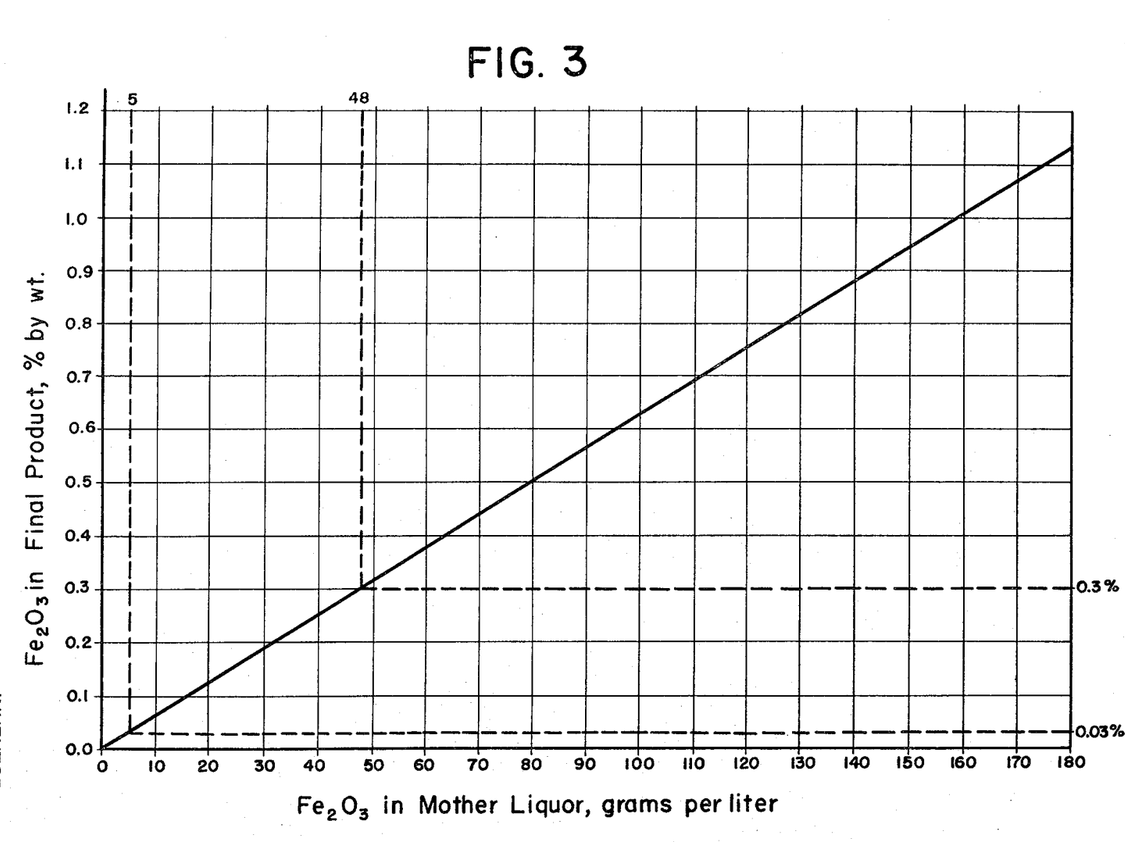
FIG. 3 is a graph showing the equilibrium relationship between the iron content of the mother liquor and the iron content of the salt product precipitated therefrom.

The quantity or relative proportion of ferric chloride contained in the aluminum chloride hexahydrate salt product precipitated from a saturated aqueous solution (or mother liquor) of aluminum chloride will depend to a large extent on the quantity of relative proportion of ferric chloride present in the mother liquor, and this relationship between the quantity of ferric chloride in the mother liquor and the quantity of ferric chloride in the final salt product obtained therefrom is shown graphically in FIG. 3 of the drawing. For example, if it is desired that the aluminum chloride hexahydrate salt product precipitated from the mother liquor contain not more than, say, 0.03% by weight $Fe_2O_3$, the concentration of ferric chloride in the mother liquor should not be permitted to exceed about 5 g./l. $Fe_2O_3$. Similarly, if it is desired that the aluminum chloride hexahydrate salt product contain not more than about 0.3% by weight $Fe_2O_3$, the mother liquor from which this salt product is precipitated should contain not more than about 48 g./l. $Fe_2O_3$. Moreover, if for purposes of the present discussion it is assumed that the feed solution introduced into the first evaporation-crystallization step of our process contains about 80 g./l. of aluminum oxide (present in the solution as aluminum chloride) and about 0.4 g./l. of ferric oxide (present in the solution as ferric chloride), and if it is desired to produce a high purity crystalline salt product containing at least 99.5% by weight aluminum chloride hexahydrate and not more than about 0.06% by weight ferric chloride in the first evaporation-crystallization step of the process, we have found that the concentration of iron in the mother liquor in the first evaporator-crystallizer (which is a saturated solution of aluminum chloride containing about 160 g./l. $Al_2O_3$ present as $AlCl_3$) should not be more than about 5 g./l. of $Fe_2O_3$ (present as ferric chloride). Furthermore, we have found that if the concentration of iron in the first evaporator-crystallizer is to be maintained at or below 5 g./l. $Fe_2O_3$ (present as $FeCl_3$), about 8.5 liters of the mother liquor in the first evaporator-crystallizer must be withdrawn therefrom for every 100 liters of fresh feed solution introduced thereinto. If the feed solution (containing about 80 g./l. $Al_2O_3$) should contain more than the aforementioned 0.4 g./l. $Fe_2O_3$ (present as $FeCl_3$), a correspondingly greater amount of mother liquor must be bled from the first evaporator-crystallizer in order to maintain the concentration of iron in the first mother liquor below the aforementioned 5 g./l. $Fe_2O_3$ (present as $FeCl_3$). When the concentration of iron in the aforementioned feed solution reaches about 2.5 g./l. $Fe_2O_3$, the amount of mother liquor that must be bled from the first evaporator-crystallizer approaches 100%, and at this point the process obviously has become unfeasible for the given conditions of feed solution composition and product purity.

Figure 1:
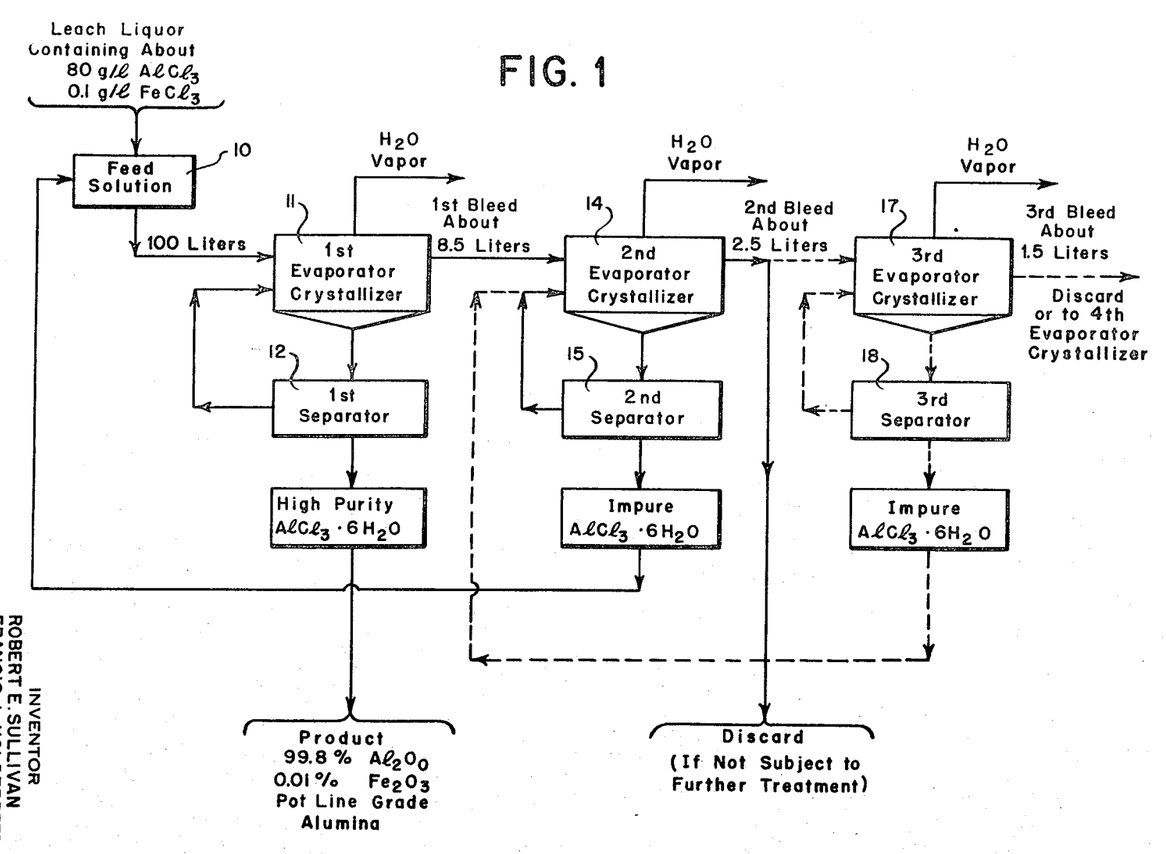
FIG. 1 is a schematic flow sheet showing the basic procedural steps involved in our process.

Referring now to FIG. 1 of the drawing, the aqueous feed solution comprising the aforesaid mixture of aluminum chloride and ferric chloride is stored in feed solution vessel 10 from which the feed solution is substantially continuously introduced at a substantially uniform rate into the first evaporator-crystallizer 11. The feed solution is concentrated in the first evaporator-crystallizer by the evaporation of water therefrom to obtain a first mother liquor comprising a saturated solution of aluminum chloride from which the desired relatively pure crystals of aluminum chloride hexahydrate precipitate. The relatively pure crystals of aluminum chloride hexahydrate are withdrawn from the first evaporator-crystallizer in the form of a slurry and are separated from the accompanying mother liquor in a suitable separatory apparatus 12 (for example, a centrifuge or filter or the like). The mother liquor extracted from the crystalline salt product is returned to the first evaporator-crystallizer 11, and the high purity crystals of aluminum chloride hexahydrate are washed and recovered for subsequent use.

Fresh aluminum chloride-containing feed solution is substantially continuously added to the mother liquor in evaporator-crystallizer 11 to replenish the aluminum chloride hexahydrate being precipitated and removed therefrom, and as water is continuously being evaporated from the mother liquor in order to maintain the concentration of aluminum chloride in the liquor at or slightly above that concentration at which the mother liquor is saturated with aluminum chloride, the concentration of ferric chloride in the mother liquor will build up to an unacceptably high level unless an appreciable quantity of the mother liquor is substantially continuously withdrawn from the main body of the liquor in the first evaporator-crystallizer 11. As previously described, the amount of mother liquor that is withdrawn or bled from the first evaporator-crystallizer 11 is such that the concentration of ferric chloride in the said first crystallizer is maintained below that concentration at which an appreciable amount of ferric chloride is caused to precipitate with or become physically entrapped in or otherwise contaminate the desired high purity aluminum chloride product of this evaporation-crystallization step. By way of example, we have found that if the feed solution contains about 80 g./l. $Al_2O_3$ (present as $AlCl_3$) and about 0.4 g./l. $Fe_2O_3$ (present as $FeCl_3$), about 8.5 liters of concentrated mother liquor must be withdrawn from the first evaporator-crystallizer 11 for every 100 liters of fresh feed solution introduced thereunto in order to prevent the buildup of ferric chloride in the first mother liquor above that concentration (that is, above about 5 g./l. $Fe_2O_3$ present as ferric chloride) at which a crystalline aluminum chloride hexahydrate product of the desired high purity can be obtained.

The mother liquor withdrawn from the first evaporator-crystallizer 11 is filtered or centrifuged or otherwise treated to remove precipitated $AlCl_3 \cdot 6$ $H_2O$ and other solids therefrom, and the clarified liquor is then introduced into a second evaporator-crystallizer 14 where an additional quantity of water is evaporated and an additional quantity of aluminum chloride hexahydrate is precipitated therefrom. It will be evident that, as water is continuously being evaporated from the mother liquor in the second evaporator-crystallizer 14, the crystalline product of the second evaporation-crystallization step of our process will be contaminated with a small but nonetheless appreciably greater quantity of ferric chloride than is present in the crystalline product of the first evaporation-crystallization step. However, it is of fundamental importance in the practice of our invention that the relative proportion of ferric chloride to aluminum chloride in the crystalline product of the second evaporation-crystallization step be no greater than (and preferably less than) the relative proportion of ferric chloride to aluminum chloride in the aluminum chloride-containing feed solution being introduced into the first evaporator-crystallizer 11. Accordingly, as in the case of the first evaporation-crystallization step of the process, it is again necessary that an appreciable quantity of the mother liquor in the second evaporator-crystallizer 14 be substantially continuously withdrawn or bled therefrom in order to prevent the ferric chloride content of the mother liquor from building up to such an extent that the crystalline salt product will be contaminated with an amount of ferric chloride proportionately in excess of the amount of ferric chloride in the initial feed solution. By way of example, in the present instance we have found that if the mother liquor in the second evaporator-crystallizer 14 contains not more than about 65 g./l. $Fe_2O_3$ (present as $FeCl_3$), the crystalline salt product precipitated therefrom will contain slightly less ferric chloride than the relative proportion of this salt present in the feed solution being introduced to the first evaporator-crystallizer 11. Moreover, we have found that if approximately 2.5 liters of the concentrated mother liquor are withdrawn from the second evaporator-crystallizer 14 for each 100 liters of aluminum chloride-containing feed solution added to the first evaporator-crystallizer 11, the concentration of ferric chloride in the mother liquor in the second evaporator-crystallizer will be maintained below the maximum permissible concentration that will produce crystalline product having an acceptable ferric chloride content.

As the crystalline product obtained from the second evaporation-crystallization step contains no greater proportion of impurities than the proportion of impurities present in the initial feed solution being introduced to the first evaporator-crystallizer 11, this impure aluminum chloride product can be recycled to the start of the process where it can be mixed directly with the said aqueous feed solution without adversely affecting the desired high purity of the aluminum chloride product of the first evaporation-crystallization step. Accordingly, the impure crystalline product withdrawn from the second evaporator-crystallizer 14 is separated from the accompanying mother liquor in an approximate separatory apparatus 15, the mother liquor extracted therefrom is returned to the second evaporator-crystallizer, and the impure aluminum chloride hexahydrate-containing crystalline product is washed and then is recycled to the start of the process as indicated in FIG. 1 of the drawing.

The portion of the concentrated mother liquor withdrawn from the second evaporator-crystallizer 14 may be discarded, if desired, provided the amount of aluminum chloride contained therein is not so great that the loss of aluminum occasioned thereby renders the process uneconomic, or it may be subjected to yet another evaporation and crystallization step to recover an additional quantity of aluminum content of the liquor. Advantageously, the mother liquor withdrawn from the second evaporator-crystallizer (if not introduced into a third evaporator-crystallizer as hereafter described) is treated for recovery of its chloride content, as hydrochloric acid, and the residual material then is discarded.

Alternatively, the mother liquor withdrawn from the second evaporator-crystallizer 14 may be subjected to a further evaporation step in a third evaporator-crystallizer 17. If the aluminum chloride-containing solution is subjected to a third evaporation-crystallization step, the concentration of impurities in the third mother liquor thus obtained should be controlled in the manner previously described so that the crystalline salt product withdrawn from the third evaporator-crystallizer 17 will contain no greater proportion of ferric chloride (or other contaminant salts) to aluminum chloride than the proportion of these salts that are present in the bleed solution withdrawn from the first evaporator-crystallizer 11 and introduced into the second evaporator-crystallizer 14. The crystalline salt product of the third evaporator-crystallizer is withdrawn therefrom in the form of a slurry, the solids content of the slurry being separated from the liquid phase in the separator apparatus 18 in the manner previously described. The liquid phase is returned to the third evaporator-crystallizer 17 and the impure $AlCl_3 \cdot 6H_2O$ crystalline product is washed and then recycled to the second evaporator-crystallizer 14 as indicated by the dashed lines in FIG. 1 of the drawing. The mother liquor bled from the third evaporator-crystallizer 17 either is discarded (preferably after being treated for the recovery of the hydrogen chloride content thereof) or is subjected to a fourth evaporation and crystallization step as in the case of the previous bleed liquors.

The mother liquor in each of the evaporator-crystallizers comprises a saturated solution of aluminum chloride and contains an appreciable quantity of crystalline aluminum chloride hexahydrate in suspension therein. The mother liquor withdrawn or bled from each evaporator-crystallizer must, therefore, be treated to render it substantially free of the crystalline precipitate and other solids suspended therein, by filtration or the like, before being introduced into the succeeding evaporator-crystallizer of the system. In FIG. 1 of the drawing the bleed mother liquor withdrawn from each evaporator-crystallizer in accordance with our invention is shown being introduced directly into the succeeding evaporator-crystallizer, and therefore the conduit or pipe line connecting the two evaporator-crystallizers must be provided with filtering or straining means in the manner known in the art. In an alternative arrangement shown in FIG. 2, some of the clarified mother liquor from the separators 12 and 15 that is normally recycled through the evaporator-crystallizer with which the separator is primarily associated can instead be diverted to the succeeding evaporator-crystallizer where it comprises the feed solution for this step of the process.

Figure 2:
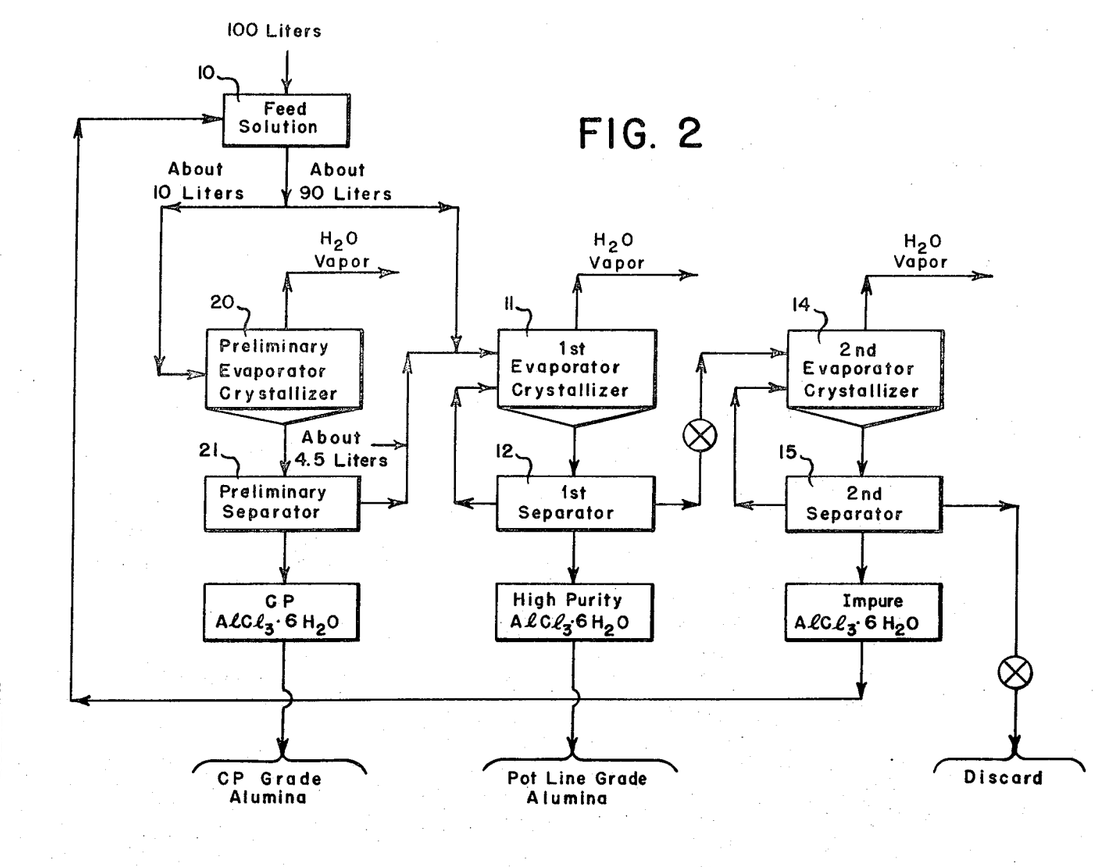
FIG. 2 is a schematic flow sheet showing a modification of our process in which a small portion of the feed solution being introduced into the first evaporator-crystallizer is first subjected to a preliminary evaporation and crystallization step.

In the modification of our process shown in FIG. 2, a minor portion of the feed solution being introduced into the first evaporator-crystallizer 11 is diverted from the main stream of the feed solution and is subjected to a preliminary evaporation and crystallization step in preliminary evaporator-crystallizer 20 to produce a small quantity of extremely high purity aluminum chloride hexahydrate from which reagent or CP grade alumina may be produced. The preliminary evaporation-crystallization step of our modified process is carried out in essentially the same manner as are the evaporation and crystallization steps hereinbefore described. However, in order to produce the desired extremely high purity salt product, the concentration of contaminant metal salts (that is, salts other than aluminum chloride) in the preliminary mother liquor is maintained at as low as a level as possible and only a small fraction of the aluminum chloride content of the mother liquor in the preliminary evaporator-crystallizer 20 is precipitated therefrom so that, as a consequence, practically none of the contaminant metal salts present in the liquor precipitate with the aluminum chloride hexahydrate product obtained. In order to prevent the build up of contaminant metal salts in the mother liquor to the level that would result in contamination of the aluminum chloride hexahydrate product, the quantity of mother liquor bled from the preliminary evaporator-crystallizer is relatively high, and we presently prefer to have all of the bleed liquor withdrawn from the preliminary evaporator-crystallizer 20 delivered to the separatory apparatus 21 where the relatively pure aluminum chloride hexahydrate precipitate is separated therefrom. The high purity aluminum chloride hexahydrate recovered from the separatory apparatus 21 is carefully washed to remove all entrained mother liquor, and the resulting crystalline salt product is dried and advantageously converted to reagent or CP grade alumina. The solid-free bleed liquor from the separatory apparatus 21 is returned to the main stream of the feed solution being introduced into the first evaporator-crystallizer 11 of the system previously described, and the now re-united feed solution is subjected to evaporation and crystallization to recover a relatively pure aluminum salt product suitable to conversion to pot line grade alumina in accordance with the practice of our invention.

The following additional example of the practice of our process illustrates the production of a relatively pure aluminum chloride hexahydrate product suitable for conversion to pot line grade alumina based on control of the chromium content (expressed as $Cr_2O_3$) of the mother liquor in the first and second evaporation steps of the process.

Figure 4:
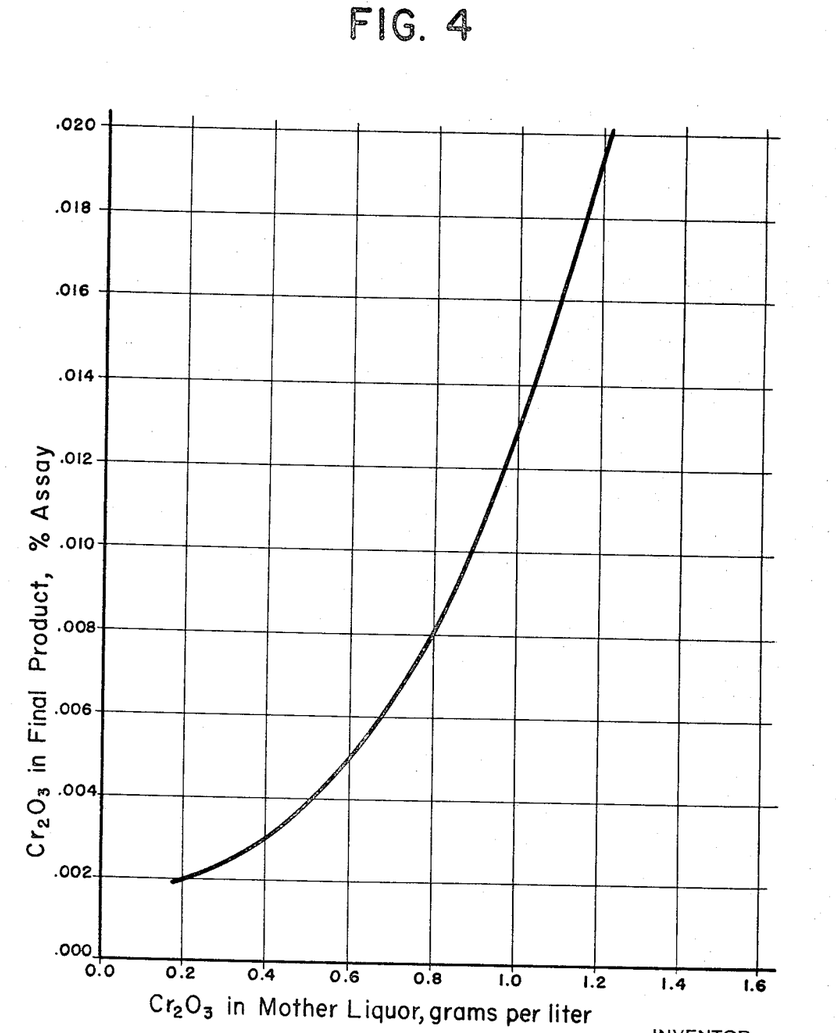
FIG. 4 is a graph showing the equilibrium relationship between the chromium content of the mother liquor and the chromium content of the salt product precipitated therefrom.

As previously described, the chromium content of the aluminum chloride hexahydrate product precipitated from a saturated solution of aluminum chloride is dependent to a large extent on the chromium content of the solution. The equilibrium relationship between the chromic oxide content of the mother liquor (present therein as chromic chloride) and the chromic oxide content of the final product is shown graphically in FIG. 4 of the drawing. In the present example of the practice of our process, in which the level of impurities in the aluminum chloride hexahydrate product was controlled by the equilibrium relationship shown in FIG. 4, a feed solution containing 80 grams per liter of aluminum oxide (present as aluminum chloride) and 0.020 gram per liter of chromic oxide (present as chromium chloride) was introduced at the rate of 100 liters of the solution per hour into a first evaporator-crystallizer. The feed solution was concentrated in the first evaporator-crystallizer by the evaporation of water therefrom to obtain a mother liquor containing 160 g./l. of aluminum oxide (present as aluminum chloride) and 0.25 g./l. of chromic oxide (present as chromium chloride), the mother liquor having a specific gravity of 1.35.

Further evaporation of water from the mother liquor resulted in the precipitation of crystals of aluminum chloride hexahydrate. A crystalline slurry product comprising essentially aluminum chloride hexahydrate and mother liquor was withdrawn from the first evaporator-crystallizer. The crystalline product was centrifuged to separate the mother liquor therefrom and then was washed with condensate from the evaporator. The crystalline product was calcined to drive off the hydrated water and chloride components thereof in the form of hydrogen chloride. The calcined product contained about 99.8% by weight $Al_2O_3$ and only 0.002% by weight $Cr_2O_3$, a chromium content well within the requirements for pot line grade alumina. 7,825 grams of the calcined product was produced for each 100 liters of feed solution introduced into the first evaporator-crystallizer.

A portion of the concentrated mother liquor in the first evaporator-crystallizer was withdrawn therefrom in accordance with our invention. It was necessary to withdraw 8.172 liters of the concentrated mother liquor from the first evaporator-crystallizer for each 100 liters of new feed solution being intoduced thereinto in order to maintain the chromium content of the mother liquor at a level below that at which an excessive amount of chromium would precipitate from the solution and contaminate the aluminum chloride product being produced. The mother liquor bled from the first evaporator-crystallizer contained 16.344% by weight of the aluminum present in the new feed.

The mother liquor bled from the first evaporator-crystallizer was introduced into a second evaporator-crystallizer where additional water was evaporated therefrom to produce a second mother liquor containing 145 g./l. of aluminum oxide (present as aluminum chloride) and 1.25 g./l. of chromic oxide (present as chromium chloride), the second mother liquor having a specific gravity of 1.38. In order to maintain the concentration of chromic chloride in the second evaporator-crystallizer at a level such that the aluminum oxide product ultimately obtained therefrom contained not more than 0.020% $Cr_2O_3$, 1.476 liters of the second mother liquor was withdrawn from the second evaporator-crystallizer for each 100 liters of feed solution introduced into the first evaporator-crystallizer.

The aluminum chloride hexahydrate crystal product precipitated from the mother liquor in the second evaporator-crystallizer would, if decomposed, produce an oxide product containing about 99.5% by weight aluminum oxide (present as aluminum chloride) and 0.018% by weight chromic oxide (present as chromium chloride). This would be an unsatisfactory final product. Therefore, the second stage crystalline product was mixed with the new feed solution and was introduced therewith into the first evaporator-crystallizer.

From the foregoing description of our new process for separating and recovering a relatively pure aluminum chloride product from impure solutions of this salt it will be seen that we have made an important contribution to the art to which our invention relates.

We claim:

1. Process for separating and recovering aluminum chloride relatively free of other metal chlorides from an aqueous solution containing said aluminum chloride and known quantities of said other metal chlorides as impurities therein which comprises concentrating a portion of said aluminum chloride-containing aqueous solution by evaporating water therefrom to obtain a mother liquor that is saturated with aluminum chloride and that contains not more than a known predetermined maximum concentration of said other metal chlorides to precipitate from said saturated mother liquor relatively pure crystals of aluminum chloride hexahydrate contaminated with not more than a predetermined maximum amount of said other metal chlorides, adding fresh aluminum chloride-containing aqueous feed solution at a known rate substantially continuously to the mother liquor to replenish the aluminum chloride content thereof, separating and recovering said relatively pure crystals of aluminum chloride hexahydrate precipitated from the mother liquor, and substantially continuously withdrawing a bleed portion of the mother liquor containing said known concentration of said other metal chlorides from the main body of said mother liquor at a rate that removes an amount of said other metal chlorides from the main body of mother liquor that is substantially equal to the amount of said other metal chlorides being added to said mother liquor with said fresh feed solution, whereby the concentration of metal chlorides other than aluminum chloride in said main body of the mother liquor is maintained below the concentration at which said other metal chlorides would by crystallization with the crystalline aluminum chloride hexahydrate product reduce the purity thereof to below the desired high purity.

2. The process according to claim 1 in which the relatively pure aluminum chloride hexahydrate product from the evaporation-crystallization step is calcined to drive off hydrogen chloride and thereby produce an aluminum oxide product suitable for use in the electrolytic production of metallic aluminum.

3. The process according to claim 1 in which a small portion of the initial feed solution is subjected to a preliminary evaporation-crystallization step wherein the quantity of aluminum chloride hexahydrate crystalline product produced is sufficiently small in relation to the volume of feed solution thus treated so as to be substantially completely free of all but trace amounts of all impurities, whereby a C.P. grade alumina product may be produced therefrom, the mother liquor from such preliminary evaporation-crystallization step being introduced into the first evaporation-crystallization step of the process.

4. The process according to claim 1 in which the quantity of the bleed portion withdrawn from the mother liquor in the evaporation-crystallization step of the process is determined by reference to the equilibrium relationship that exists between the concentration of a selected contaminant metal (present as a salt) in said mother liquor and the permissible concentration of said contaminant in the crystalline precipitate recovered from said mother liquor.

5. The process according to claim 4 in which the selected metal is ferric iron.

6. The process according to claim 4 in which the selected metal is chromic chromium.

7. The process according to claim 1 in which the bleed portion withdrawn from the main body of the mother liquor is concentrated to evaporate water therefrom to obtain a second mother liquor that contains not more than a second known predetermined maximum concentration of said other metal chlorides and to precipitate from said second mother liquor crystals of aluminum chloride hexahydrate contaminated with an amount of said other metal chlorides not in excess of the known amount of said other metal chlorides present in the initial aqueous solution based on the aluminum chloride content of said solution, in which additional bleed portion is added at a known rate substantially continuously to the second mother liquor to replenish the aluminum chloride content thereof, in which a second bleed portion is substantially continuously withdrawn from the main body of the second mother liquor at a rate that substantially continuously removes an amount of said other metal chlorides from the main body of said second mother substantially equal to the amount of said other metal chlorides that are being substantially continuously added to said second mother with said first bleed portions, and in which the crystals of aluminum chloride hexahydrate precipitated from the second mother liquor are recovered and recycled to the fresh aluminum chloride-containing solution being added to the first mother liquor.

8. The process according to claim 7 in which the free water content of the bleed mother liquor withdrawn from the last evaporation-crystallization step is evaporated to produce an impure metal chloride salt product that is then calcined to drive off hydrogen chloride which is recovered for subsequent use.

9. The process according to claim 7 in which the bleed portion of the second mother liquor withdrawn from the second evaporation-crystallization step of the process is subjected to a third evaporation-crystallization step that is essentially the same as said second evaporation-crystallization step, the impure aluminum chloride hexahydrate product precipitated and recovered from the mother liquor of said third evaporation-crystallization step containing no greater a proportion of contaminant salts that the proportion of these salts present in the first mother liquor withdrawn from the first evaporation-crystallization step and introduced into the second evaporation-crystallization step of the process, the quantity of the bleed portion of the third mother liquor being substantially continuously withdrawn from the third evaporation-crystallization step of the process being such that the concentration of metal chlorides other than aluminum chloride in the third mother liquor is maintained below that concentration at which the aluminum chloride hexahydrate product precipitated and recovered therefrom contains a greater relative proportion of said other metal chlorides than are present in the first mother liquor being introduced into the second evaporation-crystallization step of the process.

10. The process according to claim 9 in which the free water content of the bleed mother liquor withdrawn from the last evaporation-crystallization step is evaporated to produce an impure metal chloride salt product that is then calcined to drive off hydrogen chloride which is recovered for subsequent use.

References Cited
UNITED STATES PATENTS

| | | | |
|---|---|---|---|
| 2,189,376 | 2/1940 | Burman | 23—143 |
| 2,217,099 | 10/1940 | Burman | 23—154 XR |
| 2,376,696 | 5/1945 | Hixson et al. | 23—143 |

OSCAR R. VERTIZ, *Primary Examiner.*

EDWARD STERN, *Assistant Examiner.*